United States Patent Office 3,608,294
Patented Sept. 28, 1971

3,608,294
APPARATUS FOR PRODUCING COHERENT BODIES FROM ASBESTOS DISPERSIONS
William K. Donaldson, 23 Cringle Drive, Cheadle, Cheshire, England; and Werner Wilke, Schillerstrasse 34; and Hans Fetzer, Emil-Kostweg 5, both of Schwabisch Hall, Germany
Application Apr. 14, 1969, Ser. No. 839,748, which is a continuation-in-part of application Ser. No. 510,246, Nov. 29, 1965. Divided and this application June 9, 1969, Ser. No. 831,783
Claims priority, application Great Britain, Dec. 4, 1964, 49,445/64; May 7, 1965, 19,469/65; Austria, May 3, 1966, A 4,176/66; Dec. 23, 1966, A 11,853/66
Int. Cl. D02g 3/06, 3/20
U.S. Cl. 57—35     5 Claims

ABSTRACT OF THE DISCLOSURE

An apparatus for producing asbestos yarn from an aqueous dispersion of asbestos fibers comprises supply means for the dispersion with a dispensing device for shaping the dispersion into a travelling film strip onto the surface of a movable carrier structure. As the surface travels past the outlet of the dispensing device, it entrains the dispersion. Applicator means are provided for covering the surface of the carrier structure with coagulating agent so that the entrained dispersion coagulates to a film strip material while in contact with the carrier surface. The strip, after separation from the carrier surface reaches a pot-spinning device or other twisting means which is located downstream of the carrier surface and twists the coagulated film strip to yarn.

---

This is a division of our copending application Ser. No. 839,748, filed Apr. 14, 1969, for Production of Coherent Bodies From Fluids, which is a continuation-in-part of the application Ser. No. 510,246, filed Nov. 29, 1965, now abandoned, and claims priority rights based upon two British application filed Dec. 4, 1964 and May 7, 1965, and two Austrian applications filed May 3, 1966 and Dec. 23, 1966.

This invention relates to apparatus for the production of coherent bodies composed predominantly of asbestos from an aqueous dispersion of asbestos fibers and a reagent by causing the reagent to react with a coagulating liquid to produce a precipitate that binds the fibers. The reagent in the dispersion may, for instance, be a soluble soap and the coagulating liquid which the dispersion enters may be a solution in which there are cations of a polyvalent metal or hydrogen or both so that the soluble soap is converted into a water-insoluble soap or a water-insoluble fatty acid, which is the binding agent. In apparatus according to the invention any reagent and any coagulating liquid which will react to form a binder may be used, but most conveniently the reagent is a sodium soap and the coagulating liquid is a solution of aluminium sulphate or zinc sulphate.

Asbestos dispersions of the kind in question, which are usually of chrysotile asbestos, may be made with either one or more than one dispersing agent. A water-soluble soap used as the reagent for the subsequent coagulation acts also as a dispersing agent. The dispersions tend to be unstable, and begin to coagulate not only on contact with a coagulating liquid but also if they are diluted. A typical dispersion is somewhat viscous, say of the viscosity of cream.

The invention is based on the observation that when such a dispersion and coagulating liquid are so brought into contact with one another that there is an interface between them a film is formed which can be continuously drawn away from the interface.

According to this invention, dispersion in a pool is subjected to traction by an endless carrier that is wet with the coagulating liquid so that a layer of dispersion is removed, the surface of the layer in contact with the carrier being at least partly coagulated and the opposite surface of the layer being exposed to air and out of contact with any transverse solid surface such as a doctor blade or roller while it remains uncoagulated, some uncoagulated dispersion at this exposed surface of the layer is caused to pass back against the movement of the carrier so as to leave on the carrier a partially coagulated film of dispersion with an exposed face, further coagulating liquid is applied to the exposed face of the film, and the film is stripped from the carrier during or after the application of the further coagulating liquid.

The carrier, it will be seen, must carry a layer of dispersion with it, and for this to be done there must be an interface between the carrier and the pool. The object is to produce a thin uniform film which can subsequently be stripped from the carrier, and it is therefore necessary to prevent excess dispersion from being carried forwards. This excess dispersion may run backwards under the influence of gravity if the surface of the carrier moves upwards away from the pool. The excess dispersion can also be moved backwards by an air blast, and such a blast may be used to assist the action of gravity.

There are various ways of ensuring that an interface continuously exists between the carrier and the pool. Thus, the surface of the carrier may make contact with the upper surface of the pool of the dispersion, or be dipped into the pool.

Particularly advantageously the surface of the carrier may form an upwardly moving end wall of a trough or other vessel that contains the pool. Again the pool may be formed on the surface of the carrier by applying dispersion to that surface. If this is done at a point where the surface is moving upwards, the dispersion tends to run down the carrier but a layer is carried upwards. If an air blast is used to move excess dispersion in the layer against the movement of the carrier, the surface of the carrier may be horizontal or even slightly downwardly inclined at the point where the pool is formed.

In such apparatus according to the invention the film is formed at an interface between the carrier and the pool, and the carrier does not cooperate with any other surface to form a channel which determines the shape of a body of the dispersion. Hence there is no orifice, or narrow gap between the carrier and another surface, through which the dispersion passes and which could be blocked by small bundles of undispersed fiber or by foreign bodies such as are regularly found in the raw asbestos from which dispersions are formed.

It follows also that the cross-sectional dimensions of the film are formed inter alia by the flow characteristics of the dispersion and the geometry at the interface.

It is found best to restrict the amount of coagulating liquid carried to the interface by the carrier, primarily because any excess of coagulating liquid may run off the carrier into or onto the pool and form clots in the pool.

The endless carrier may be either a belt or a drum, and in either case it may have a porous or an impermeable surface; moreover, it may be porous throughout and not only on the surface. A carrier with a compressible porous surface carries coagulating liquid to the dispersion readily, and in fact should be compressed by a roller to expel excess coagulating liquid after the film has been stripped. There is no difficulty in stripping the film from a porous carrier that is wet with coagulating liquid, because soluble soap or fatty acid will not enter the pores if they either contain or have their walls wetted with a coagulating liquid. Instead a layer of insoluble soap or fatty acid (and fibers) is formed immediately on the carrier, but no part of this layer penetrates beyond the surface irregularities of the carrier. It is easy to strip off such a layer.

A carrier with an impermeable surface is effective provided that it is uniformly wetted with coagulating liquid.

The carrier may also be a gauze, such as the wire gauze used in a Fourdrinier paper-making machine.

After the removal of excess coagulating liquid, the layer is only partially coagulated. Although sulphate or other coagulating liquid will diffuse into the film from the carrier until this is stripped from the carrier, the applications of further coagulating liquid to the exposed face is required in order rapidly to complete the coagulation necessary to render the film adequately strong for stripping and subsequent handling. Although this further coagulating liquid may be sprayed onto the film, it is preferred to provide it as a bath into which the film is carried. In accordance with the thickness of unreacted dispersion carried away by the film, which in turn depends to some extent upon the viscosity of the dispersion, the length of the bath of coagulating liquid through which the film is carried to complete the reaction of the dispersion on it may be from 1 to 20 feet.

The film is stripped from the carrier at some convenient point in its run, which may be outside the bath of coagulating liquid or in that bath. Stripping in the bath presents the advantage that coagulating liquid can act on the inner surface of the film as this film is stripped, and thus assist in ensuring that the reagent in the film of the dispersion reacts completely. The stripped film may be led to a draw-off wheel.

Once a skin has been formed on the exposed surface of the film the cross-sectional dimensions are essentially determined. Even so it is desirable that after being stripped the film should not come into contact with any transverse surface until coagulation is complete. If there is uncoagulated dispersion inside a coagulated outer skin of the film at a time when the film is subjected to any pressure such as may be exerted by passage in contact with a scraper blade or over a roller, the uncoagulated dispersion tends to move backwards inside the film and to form a bubble, which bursts and breaks the film.

The film may be stripped from the carrier by hand at the start of the process, but may break in the course of continuous operation. The following film may then adhere to the carrier. Although it may be in turn stripped by hand, automatic stripping is desirable. This may be effected by a jet of fluid, which is preferably coagulating liquid, directed at the carrier. This jet may flow throughout the whole operation. When the leading edge of the partially coagulated film has been lifted from the moving carrier, stripping of the film continues as the carries moves past the jet. The film so removed swims about in the coagulant bath and is readily picked out by the operative and linked to a draw-off wheel. If there is continuous flow of the coagulating liquid through the bath towards a weir and a draw-off wheel is placed at the weir, the free end of the film may be carried to and over the weir to be caught by the draw-off wheel automatically.

After the excess dispersion has been removed, the film composed partially of coagulated dispersion and partially of unreacted dispersion may be up to about half a millimeter thick. The stripped film is wet, and it may, if desired, be dried before or after reaching the draw-off wheel. An important final product of the invention is yarn, which may be formed by spinning a film, two or more narrow films, or a strip or strips slit from a wide film. The film or strip may be twisted or spun wet, or may be dried, either by mere exposure to air or by heat. The final thickness of the film, if dried flat, may be say, one-hundredth or two-hundredths of a millimeter.

The carrier may vary very considerably in width, from for example 1 millimeter in order to produce a fine yarn to 1000 or more millimeters in order to produce a paper-like product. A number of parallel narrow films may be formed on a single carrier.

As an example, the dispersion may be made with the use of two dispersing agents, namely a water-soluble soap and another anionic surface-active dispersing agent, and may have the following composition by weight:

| | Parts |
|---|---|
| Tap water of hardness of about 30 p.p.m. expressed as calcium carbonate (at 60° C.) | 1100 |
| Chrysotile asbestos (Grade 2) | 20 |
| Sodium dodecyl benzene sulphonate | 1.2 |
| Soap (sodium salts of mixed long-chain fatty acids, average water content 20%) | 8 |
| Aluminium sulphate | 0.7 |

The coagulating liquid may be a 5% solution of zinc sulphate in water. We find that a continuous film can be formed from such a dispersion and coagulating liquid at a rate of 20 meters per minute.

The dispersion may contain other particles or fibers, which may be colloidally or non-colloidally dispersed. Examples are particles of polymers or graphite and glass fibers. These particles or fibers become part of the film, either by reaction or by mechanical entrainment. Emulsions and latices, for example of rubber, may also be present and become part of the film.

The invention may be carried out in various forms of apparatus, some of which are shown diagrammatically in the accompanying drawings, in which.

Figure 1:
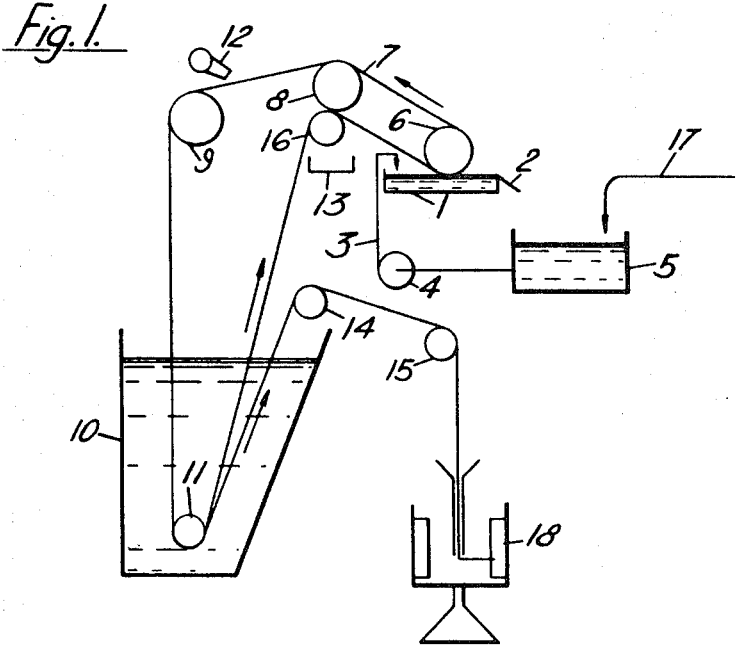
FIG. 1 shows one form of apparatus.

In the apparatus shown in FIG. 1, a pool of dispersion is maintained in a vessel 1 having an overflow weir 2 at one end, fresh dispersion being pumped in at the other end through a pipe 3 by a pump 4 from a reservoir 5 so that there is a continuous flow through the vessel. A roller 6 around which a porous endless belt 7, wet with coagulating liquid, runs is disposed so that as the belt passes beneath the roller its surface makes contact with the surface of the pool. Over the area of contact between the belt and the pool the belt exerts traction on the dispersion, and it carries a layer of dispersion out of the pool. Some of this layer runs backwards into the pool to leave a film on the upper surface of the belt as this runs upwards from the roller 6 to pass round a roller 8. The belt then travels approximately horizontally to run round another roller 9 from which it travels downwards to enter a bath of coagulating liquid in a tank 10 in the bottom of which there is a further roller 11 round which the belt runs to travel out of the tank. It is found that in the downward run of the belt unreacted dispersion on the belt may move downwards and create irregularities in the film. It may therefore be advantageous to spray coagulating liquid onto the film through a nozzle 12 at a point where the belt is running horizontally, in order to increase the amount of reaction that takes place before the film becomes vertical.

The film is stripped from the belt as the latter begins its upward run in the tank 10 and travels for some distance through the bath unsupported by the belt. On leaving the bath it passes over a draw-off roller 14 from which it travels over a further roller 15 to a pot-spinning device 18.

The belt travels onwards and out of the tank, carrying coagulating liquid with it. On leaving the tank 10 the belt 7 passes through a nip between the roller 8 and a roller 16 to remove some but of course not all of the liquid it carries, and then back to the pool of dispersion. The liquid removed is caught by a trough 13. The belt may be engaged by a brush to clear away any fibers from it that have not been removed from it on the stripping of the film.

For the reason given above, the depth of the bath of coagulating liquid in the tank 10 and the speed of the belt should be so correlated that the film does not come into contact with the draw-off roller or any other hard surface until it is coagulated throughout its thickness.

For successful continuous operation it is necessary that a dispersion of constant concentration and a coagulating liquid of constant concentration shall be brought into contact at the surface of the belt, that is to say, at the interface between the belt and the pool. Some of the coagulating liquid may diffuse into the pool of dispersion. Moreover, there may be some dilution of the dispersion by reaction products as a result of the reaction. The dispersion will not remain stable if its concentration varies to any great extent, and if the concentration does vary it is necessary continuously to replace the dispersion at the area of contact by fresh dispersion. This is done in the apparatus shown in FIG. 1 by causing the dispersion continuously to flow through the pool in a circulatory system, and restoring its concentration in the course of the circulation. In the course of this concentration any undesired reaction products should be neutralized. Conveniently a main supply of dispersion entering the reservoir through a pipe 17 may be rather more concentrated than is desired in the pool so that when it is mixed with the somewhat diluted dispersion flowing over the weir 2 a dispersion of the proper concentration is formed.

Figure 2:
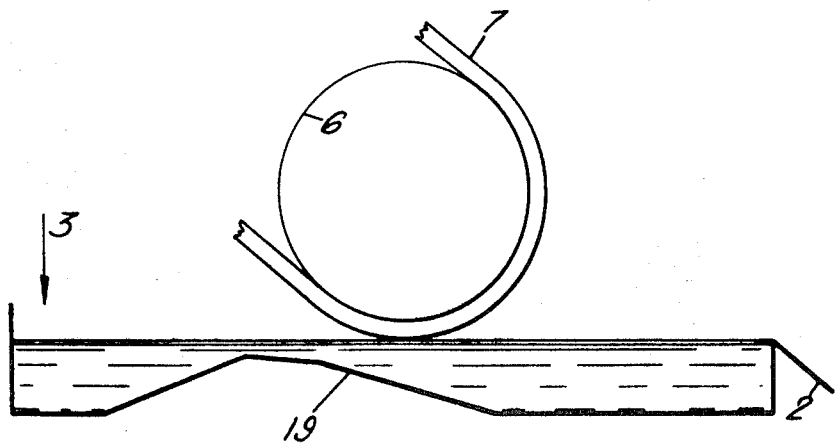
FIG. 2 shows one form of vessel that may be used to hold the dispersion.

When the process is carried on in an apparatus of the kind shown in FIG. 1 the fibers are predominantly oriented in the direction of movement of the belt. Although this gives high strength in one direction it also gives low extensibility. In order to produce a film with more random orientation the dispersion should be decelerating on arriving at the area of contact. Such deceleration may be produced by appropriately shaping the vessel that holds the pool. For example, as shown in FIG. 2, the base of a vessel that contains the pool of dispersion may slope downwards as shown at 19 beneath the roller 6 so that over the area of contact the dispersion is decelerating. It is then desirable that the actual velocity at the area of contact should be very much the same as that of the belt 7. Again the dispersion may be passed through the vessel parallel to the axis of the roller 6 so that the fibers will be predominantly oriented transversely to the belt 7.

When the carrier is a porous belt, as in the apparatus shown in FIGS. 1 and 2, it absorbs excess solution, that is to say undesired reaction products, from the film. Thus the risk of dilution of the dispersion or accumulation of undesired products at the area of contact of the belt with the pool is low, and it may be unnecessary continuously to replace the dispersion there by fresh dispersion. The belt is preferably composite, comprising a non-porous backing and a layer of compressible absorbent sponge or other porous material.

Figure 3:
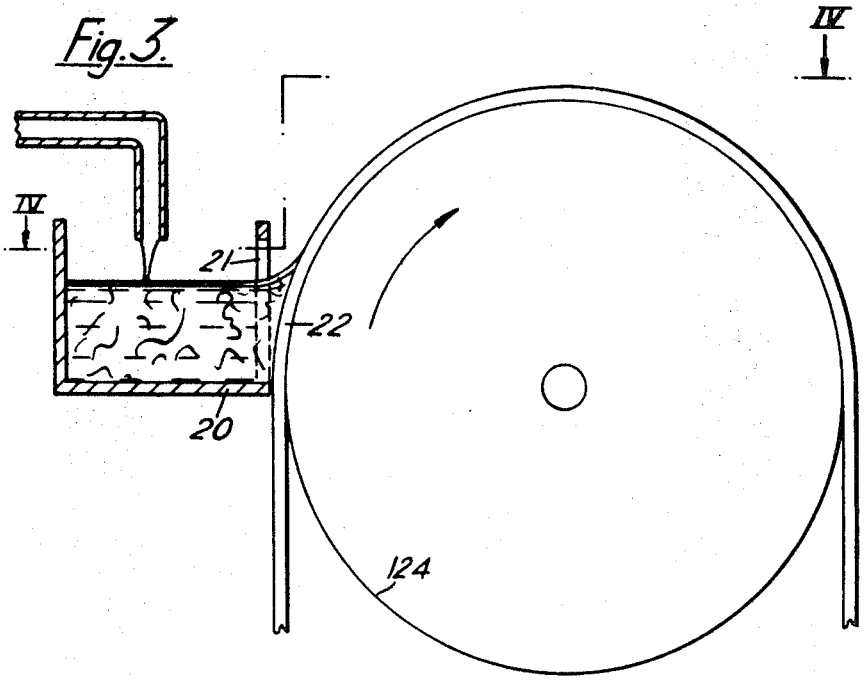
FIG. 3 shows part of another apparatus in elevation.
Figure 4:
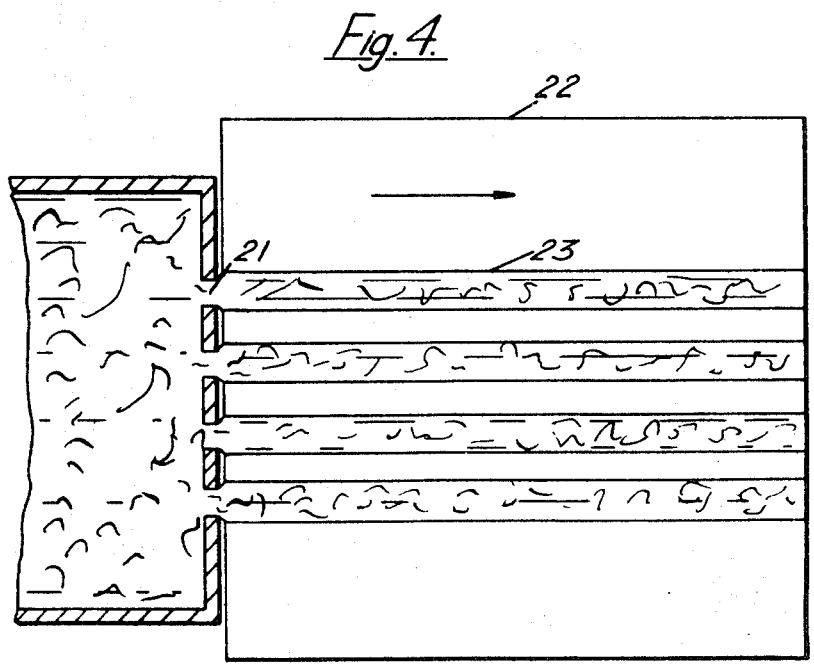
FIG. 4 is a section on the line IV—IV in FIG. 3.

In the apparatus shown in FIGS. 3 and 4, a pool of dispersion is maintained in a trough 20 having an end which is formed with vertical slots 21. The carrier is a belt 22 that runs round a drum 124. The slotted end of the trough 20 is placed against a curved, upwardly moving, part of the carrier 22 so that it forms a tangent, approximately at the bottom of the slots 21. The dispersion flows through each slot and across the intervening gap towards the carrier to be carried upwards as layers 23, which tend to spread out sideways as shown. Excess dispersion runs backwards, to leave films each of width greater than the width of the slot by an amount depending on the height of the free surface of the dispersion above the level where the slot structure forms a tangent to the carrier. The carrier 22 should be close enough to the end of the trough 20, and run upwards at a speed high enough, to ensure that any dispersion tending to run downwards from the base of the trough is picked up and carried away by the carrier before it can do so. The carrier on leaving the drum runs downwards into a bath of the coagulating liquid.

Dispersion is delivered to the trough at a constant rate, and should be removed as film at exactly the same rate.

The slots shown in FIGS. 3 and 4 are particularly suitable when the object is to produce a number of narrow films to be twisted together to form yarn. If a wide film is required, the end of such a trough as that shown at 20 may be wholly open. Its side walls may be curved to match the path of the carrier, and preferably are upwardly divergent.

It will also be appreciated that the carrier cooperating with a trough that has either an open or a slotted end may be a drum.

In one apparatus with a slotted trough, there were nine slots, each 4 mm. wide, to produce nine films. The slots started at the bottom of the trough 20 and extended upwards for 52 mm. The slotted wall of the trough was flat and formed an angle of 97° with the base. The base was located in a horizontal plane close to the horizontal axis of a sponge-covered drum 180 mm. in diameter. Dispersion was fed continuously into the trough, and in operation it stabilized at a depth of 25 mm. There were nine strips of film each about 6 mm. wide before being stripped from the carrier.

Figure 5:
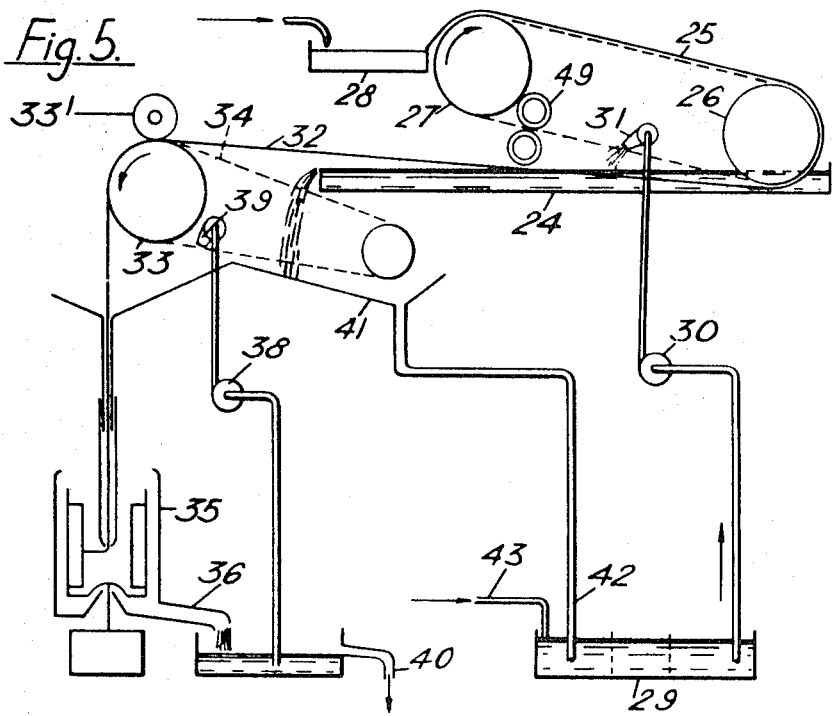
FIGS. 5, 6 and 7 show three further forms of apparatus.

FIG. 5 shows an apparatus of somewhat different and simpler layout. The bath of coagulating liquid is in a shallow horizontal tank 24 instead of a vertical tank as shown in FIG. 1. A gauze belt carrier 25 is used and runs round only two rollers 26 and 27 and picks up dispersion from a trough 28 that resembles the trough 20. There is a reservoir 29 of coagulating liquid from which a pump 30 draws liquid continuously and delivers it to a nozzle 31 from which this liquid passes as a jet onto the upper side of the lower run of the belt 25, thus performing two functions. The first is to clear the belt of any fibers it may be carrying, and the second is to strip the film, shown at 32, from the belt both initially and if it should break. The belt passes between two rollers 49 for the removal of excess liquid. The stripped film travels through the coagulating liquid in the tank 24 to a draw-off roller 33 over which a perforated belt 34 passes. From the belt the film 32 travels downwards to a pot-spinning device 35. The spinning imparts tension to the film, and it is undesirable that this tension should be applied to the film at any point when this is not fully coagulated. Accordingly a small nip roller 33' is provided to engage the film on the roller 33. Liquid runs down with the film to the pot-spinning device 35, assisting to strip the film from the roller 33, and flows from the device 35 through a pipe 36 into a tank 37. A pump 38 draws from this tank to deliver liquid to and through a nozzle 39 to strip the film if necessary. Excess liquid runs from the tank 37 to waste through an overflow 40.

Coagulating liquid continuously flows out of the tank 24 and through the belt 34 into a hopper 41, from which it is returned through a pipe 42 to the reservoir 29. Fresh coagulating liquid is supplied to the reservoir 28 through a pipe 43.

Figure 6:
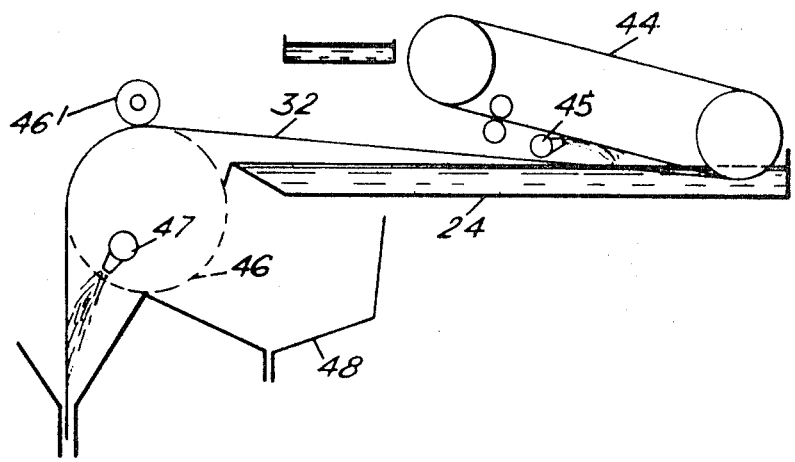

If instead of a gauze belt a compressible porous belt such as that shown in FIG. 1 is used, the jets must of course be otherwise arranged. This different arrangement is shown in FIG. 6, in which there is a porous belt 44 stripped by coagulating liquid delivered through a nozzle 45. In this figure the film 32 passes over a perforated draw-off wheel 46 and is stripped by a jet from an internal nozzle 47. The application of spinning tension to the film before it reaches the wheel 46 is prevented by a nip roller 46'. The wheel is washed by coagulating liquid leaving the tank 24 and flownig into a hopper 48.

Figure 7:
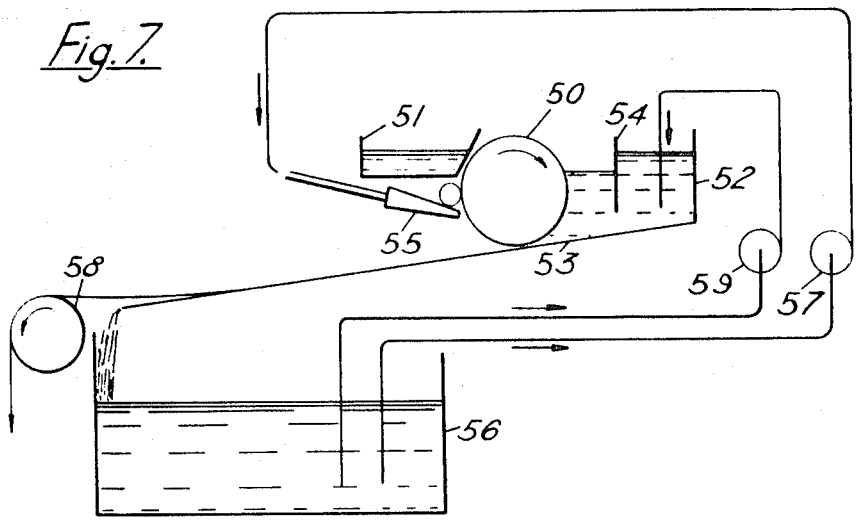

FIG. 7 shows an apparatus in which the carrier is a drum 50 that picks up dispersion from a trough 51 and forms one wall of a container 52 for coagulating liquid. The bottom of this container is formed by a chute 53, and the drum 50 nearly comes into contact with this chute. A baffle 54 is provided in the container 52 to separate that part of the container to which coagulating liquid is supplied from the drum, so that there is a quiet pool of liquid close to the drum. The dispersion at the exposed face of the film reacts with liquid in this pool, and more liquid runs continuously down the chute 53 in contact with the film.

A jet of stripping liquid is supplied through a nozzle 55, being drawn from a reservoir 56 by a pump 57. This jet clears the drum if there is any breakage and yet the film is fed forwards, passing down the chute 53.

By the time the stripped film reaches the end of the chute 53 the coagulation is complete. The film passes over a draw-off wheel 58 and excess coagulating liquid flows over the end of the chute into the reservoir 56. From this reservoir the liquid is pumped by a pump 59 to the container 52, as well as by the pump 57 to the nozzle 55.

It will be understood that there may be several nozzles 55 delivering stripping jets if desired.

Figure 8:
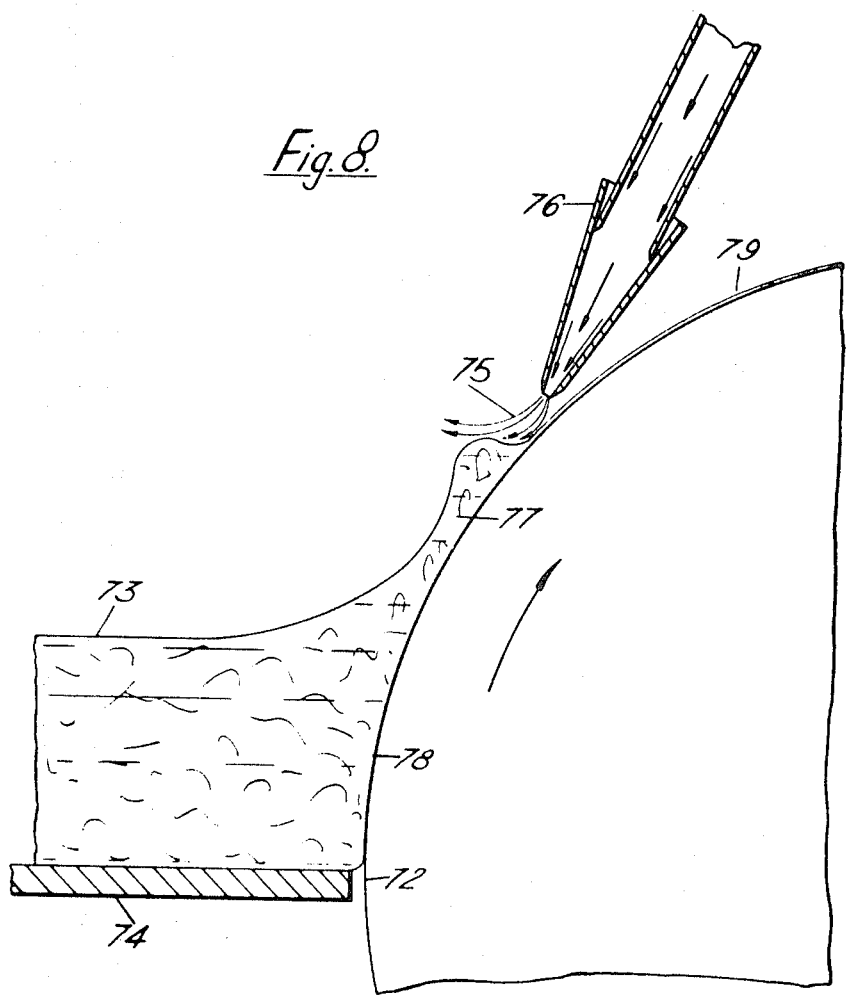
FIG. 8 illustrates the use of an air blast.

FIG. 8 shows part of an apparatus in which the pool is maintained in a trough similar to the troughs shown in FIGS. 3 to 7. In this apparatus a current of air is used to assist the action of gravity in causing excess dispersion carried away from the pool to return to the pool. A carrier 72 wet with coagulating liquid moves upward past a pool of dispersion 73 in a trough 74. In this figure the very thin, partially coagulated, layer at the surface of the carrier is shown at 78 and the layer drawn upwards at 77. A jet of air 75 issuing from a nozzle 76 is directed against the layer 77 of dispersion on the carrier so that excess coagulating liquid is returned to the pool 73 at the surface of the layer 77 and only a limited amount passes forward with the carrier 72 to form a thin film 79, which is subsequently coagulated completely before or after being stripped from the carrier.

Figure 9:
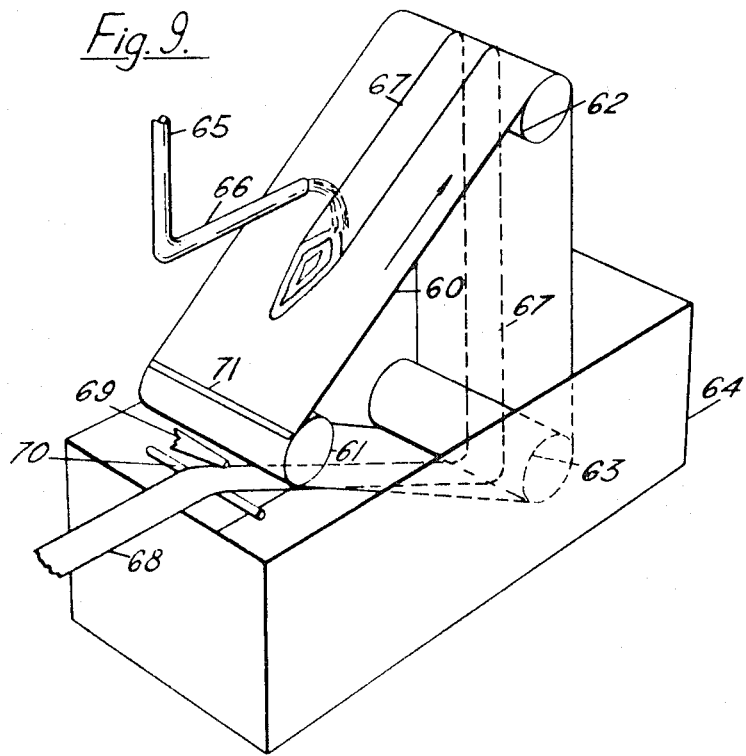
FIG. 9 shows another form of apparatus.

FIG. 9 shows an apparatus in which the dispersion is formed into a pool on the surface of a carrier. This carrier is an impermeable belt 60 which runs round three rollers 61, 62 and 63, the last being immersed in a bath of coagulating liquid in a tank 64. The carrier 60 runs upwards from the roller 61 to the roller 62 and in the course of the upward run receives dispersion fed at a constant rate through a pipe 65 that terminates in a spout 66. The dispersion forms a pool on the carrier 60, which carries a layer away from the underside of the pool. Some of this layer runs backwards to the pool, and some spreads itself out to form a film 67. This film is carried into the coagulating liquid in the tank 64. The coagulated film, shown at 68, is stripped by a jet of coagulating liquid delivered through nozzle 69 and drawn off over a roller 70. Excess coagulant is removed from the carrier 60 by a scraper 71.

Figure 10:
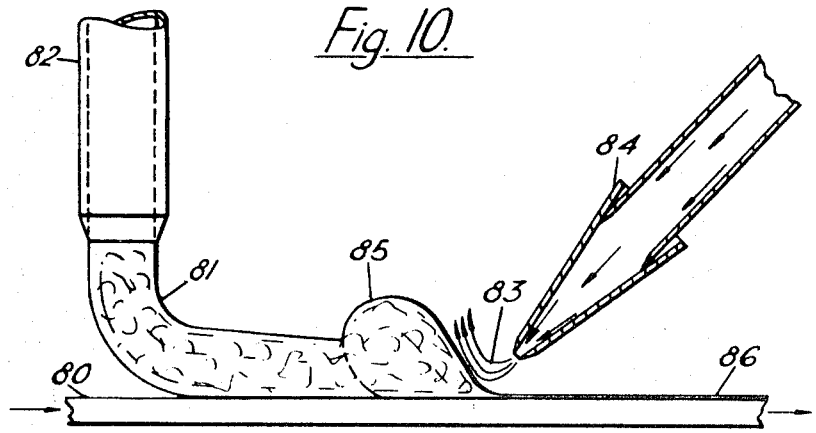
FIG. 10 is an elevation.
Figure 11:
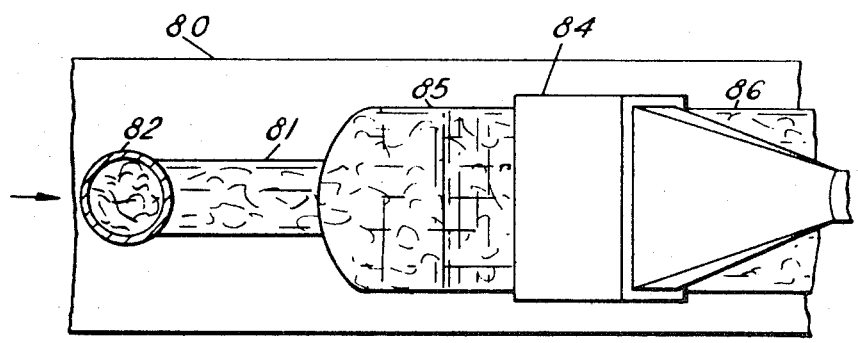
FIG. 11 is a plan of yet another form of apparatus.

The apparatus shown in FIGS. 10 and 11 is similar to that in FIG. 9 except that the action of gravity in causing some of the layer to move backwards and spreading the layer across the carrier is replaced by the action of a current of air. A carrier 80 wetted with coagulating liquid is moving in an approximately horizontal plane. It receives a stream 81 of dispersion issuing from a spout 82. This stream is caried along as a layer, and it is struck by a jet of air 83 issuing from a nozzle 84. This jet blows the upper part of the layer backwards so that the layer increases in depth and spreads sideways, forming a pool 85 of greater depth than the layer. Uncoagulated dispersion is carried forwards, with the layer of coagulated dispersion that is in contact with the surface of the carrier, as a film 86. The pool 85 is stable in that the mass of fibers removed in the film 86 in unit time equal the mass of fibers which is fed onto the carirer 80 by the stream 81. The carrier 80 subsequently carries the film 86 to a bath of coagulating liquid.

In all the apparatus excess coagulating liquid may be removed from the carirer in various ways, for example by being scraped by a blade or blades. If the carrier is of gauze, it may pass through the nip between two rollers one of which has a porous compressible surface. Again excess liquid may be removed from a gauze carrier by suction. Again, if a gauze or impermeable carrier travels slowly enough, natural drainage may be adequate and no special steps need be taken to remove coagulating liquid from it before it again comes into contact with the pool of dispersion.

As described above, the invention affords the production of asbestos yarn by spinning or twisting the film strip or the several strips of coagulated asbestos dispersion after they have been stripped from the moving carrier surface. In the abovedescribed embodiments illustrated in FIGS. 1 and 5, such twisting of the strips is effected by continuously passing the strips to a pot-spinning device (18 in FIG. 1, 35 in FIG. 5) at the end of the strip travel. Each rotation of the spinning pot imparts one turn of twist to the material being spun. For example, a pot speed of 3000 r.p.m., at the above-mentioned delivery rate of 28 m./min., would result in twisting yarn about 100 times per running meter. As to the twisting effected by pot spinning, reference may be had to (1) Eber Midgley, Technical Terms in the Textile Trade, vol. II, published 1932 by Emmott & Co. Limited, London (page 207); (2) George E. Linton, The Modern Textile Dictionary, published 1954 by Duell, Sloan and Pearce, New York (pages 510 and 628); (3) McGraw-Hill Encyclopedia of Science and Technology, 1960 (page 618); or also to the copending application of Wilke et al., Ser. No. 681,050, filed Oct. 23, 1967, now Patent No. 3,475,894.

We are aware that, in retrospect, the production of a film strip upon a moving carrier according to the invention may be found to be comparable to similar method steps known in the manufacture of products from organic and non-fibrous substances, such as rubber and plastics, dissolved or emulsified in organic solvents. Heretofore, however, the industries and persons dealing with asbestos production techniques have been unaware of the useful potentiality inherent in the tendency of aqueous asbestos-fiber dispersions to form, on contact with a coagulant-wetted surface, a coherent film capable of being stripped as a whole from the carrier. Also remarkable in this respect is the high production rate attainable by the invention, such as the abovementioned rate of 20 m./min. achieved with a dispersion although it contained 55 times more water than asbestos fibers, for example. While a dispersion or emulsion of an organic liquid in a solvent will tend to form a film of fully homogeneous constitution when a structure wetted with coagulant is dipped into such a liquid, no such homogeneity can be obtained if a carrier surface wetted with coagulant is passed through a dispersion of asbestos fibers, i.e. an inorganic non-dissolved material. Hence, it should be expected that at best a layer of unoriented fibers will be deposited and that such a layer will exhibit only slight coherence and not be directly suitable for further fabrication. It is a surprising phenomenon, applied to advantage by the present invention, that a contact-entrainment deposition of films can also be successfully and advantageously carried out with aqueous asbestos dispersions and will result in high quality strands of uniformly oriented fibers imparting to the film the mechanical strength and coherence required for stripping the film and spinning it to yarn.

We claim:

1. Apparatus for producing asbestos yarn from an aqueous dispersion of asbestos fibers, comprising supply means for said dispersion, said supply means having a dispening device for shaping the dispersion into a travelling film strip, said device having a dispersion outlet, movable carrier structure having a conveying surface movable past said outlet and engageable by the dispersion issuing from said outlet for subjecting said issued dispersion to traction in the travel direction of the carrier structure, applicator means for applying coagulating agent to said surface so that the dispersion at least partially coagulates to a film material while in contact with said carrier structure, and means located downstream of said carrier structure and of said applicator means and engageable with the cogulated strip material for converting the coagulated strip material to yarn in continuous operation.

2. Apparatus for producing asbestos yarn from an aqueous dispersion of asbestos fibers, comprising supply means for said dispersion, said supply means having a dispensing device for shaping the dispersion into a travelling film, said device having a dispersion outlet, movable carrier structure having an endless conveying surface rotatably movable past said outlet and engageable by the dispersion issuing from said outlet for subjecting said issued dispersion to traction in the travel direction of the carrier structure, applicator means for applying coagulating agent to said surface so that the dispersion at least partially coagulates to a film material while in contact with said carrier structure, and twisting means located downstream of said carrier structure and of said applicator means and engageable with the coagulated material for twisting the coagulated material during continuance of its travel so as to produce yarn from the dispersion in continuous operation.

3. In apparatus according to claim 1, comprising a container arranged for holding coagulating agent so that said carrier structure can dip into the agent, and a transport member for removing the coagulated material from the carrier structure and passing it in solidified condition to said twisting means, said transport member being mounted downstream from where the carrier structure dips into the coagulating agent.

4. Apparatus according to claim 2, comprising means for forming said film material on said conveying surface into a multitude of longitudinal and parallel strips to be twisted together by said twisting means.

5. In apparatus according to claim 2, said yarn-forming means being a pot-spinning device.

References Cited

UNITED STATES PATENTS

| | | | |
|---|---|---|---|
| 1,542,915 | 6/1925 | Sherman | 57—31 |
| 1,590,999 | 6/1926 | Czapek et al. | 264—215 |
| 2,871,652 | 2/1959 | Schwartz | 57—167X |
| 3,398,220 | 8/1968 | Port et al. | 57—167X |
| 2,578,941 | 12/1951 | Novak et al. | 57—156 |
| 2,972,221 | 2/1961 | Wilke et al. | 57—164 |

FOREIGN PATENTS

| | | | |
|---|---|---|---|
| 675,283 | 12/1963 | Canada | 264—215 |

DONALD E. WATKINS, Primary Examiner

U.S. Cl. X.R.

264—212